(No Model.) 3 Sheets—Sheet 3.
O. O. GRAVES.
GRAIN THRASHER AND SEPARATOR.
No. 287,665. Patented Oct. 30, 1883.
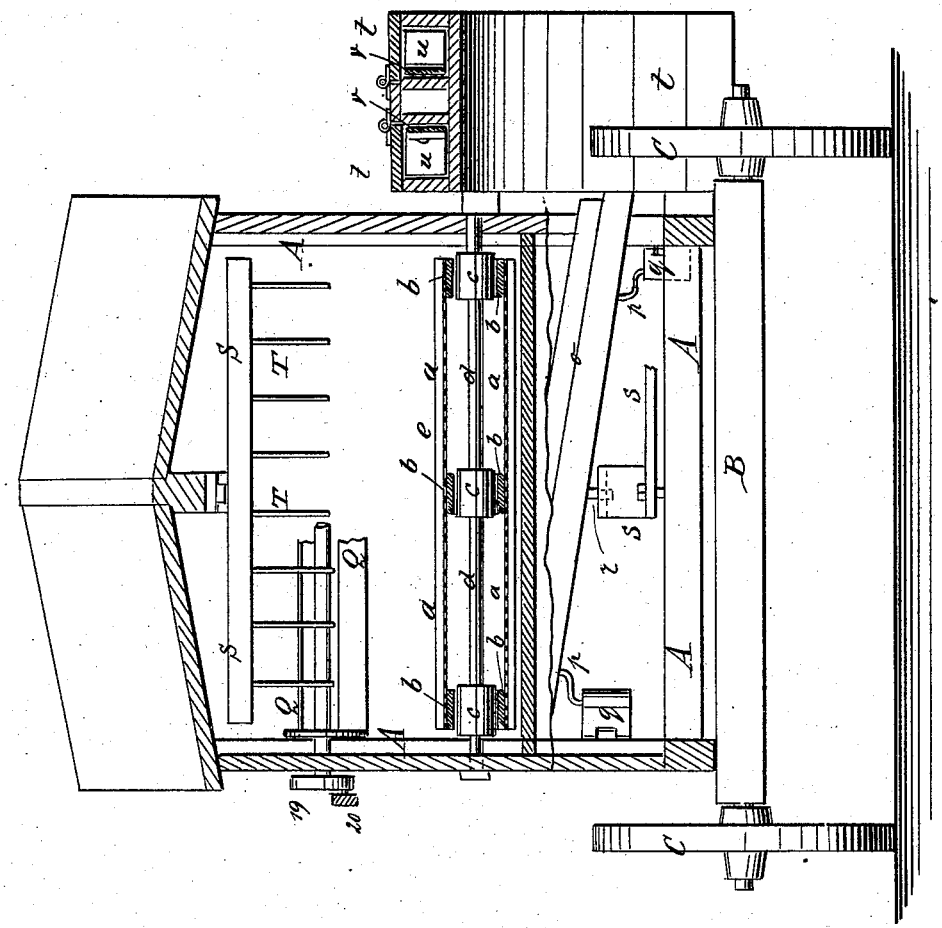
WITNESSES:
Chas. Nida
C. Sedgwick
INVENTOR:
O. O. Graves
BY Munn & Co
ATTORNEYS.

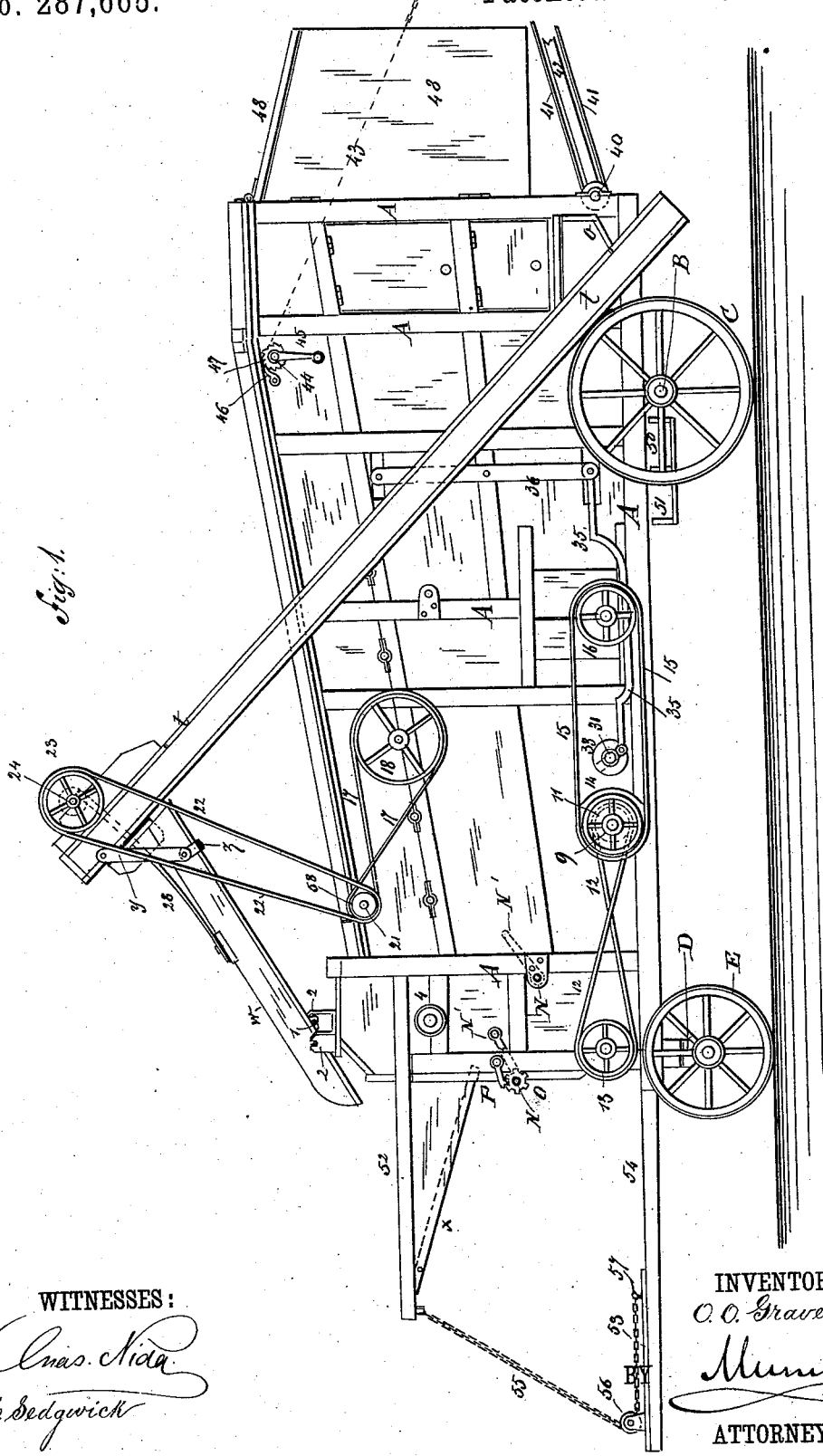

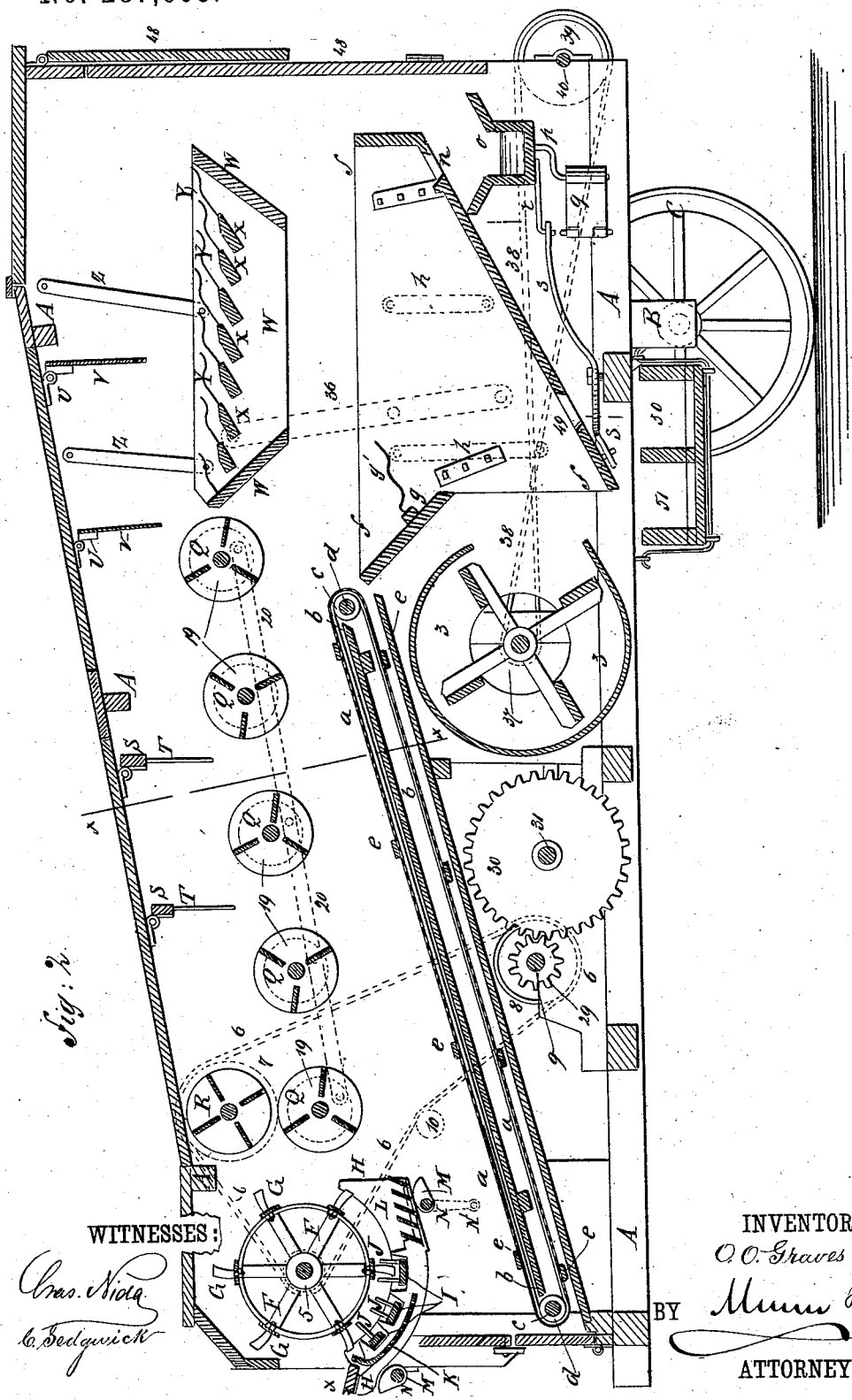

UNITED STATES PATENT OFFICE.

OLE O. GRAVES, OF HIGHLAND, DAKOTA TERRITORY.

GRAIN THRASHER AND SEPARATOR.

SPECIFICATION forming part of Letters Patent No. 287,665, dated October 30, 1883.

Application filed January 19, 1883. (No model.)

*To all whom it may concern:*

Be it known that I, OLE O. GRAVES, of Highland, in the county of Minnehaha and Territory of Dakota, have invented certain new and useful Improvements in Grain Thrashers and Separators, of which the following is a full, clear, and exact description.

Reference is to be had to the accompanying drawings, forming part of this specification, in which the same letters of reference indicate the same or corresponding parts in all the figures.

Figure 1, Sheet 1, is a side elevation of a machine embodying my improvements. Fig. 2, Sheet 2, is a sectional side elevation of the same. Fig. 3, Sheet 3, is a sectional end elevation of the improvement, taken through the line x x, Fig. 2.

The object of this invention is to facilitate the thrashing, separating, and cleaning of grain and promote thoroughness in each of said operations; and it consists in the peculiar construction and arrangement of parts, as hereinafter fully described, and pointed out in the claims.

A represents the frame of the machine, the rear part of which is attached to the axle B of the rear wheels, C, and its forward part is connected by a king-bolt with the axle D of the forward wheels, E, in the manner of an ordinary wagon.

F is the thrashing-cylinder, the journals of which revolve in bearings attached to the upper forward part of the frame A. To the cylinder F are attached rows of teeth G, which are slightly curved to the rearward, and are gradually tapered from their outer ends to the said cylinder.

At the inner sides of the frame A, a little below the cylinder F, are placed curved bars H, in the inner sides of the forward parts of which are formed recesses to receive the ends of the bars I, to which the teeth J are attached, one row of teeth J being attached to the forward bar I, and two rows of teeth J being attached to each of the other bars I.

In the forward parts of the bars H, below the recesses for the toothed cross-bars I J, are formed grooves to receive the edges of the plate K, which guides the grain passing between the two forward bars J onto the endless carrier, hereinafter described.

In the lower rear part of the bars H, in the rear of the inner bar, I, are formed grooves to receive the rack L, the cross-slats of which are inclined, as shown in Fig. 2, and are placed at such a distance apart as will allow the grain to pass between them freely.

The end parts of the bars H rest upon cams or eccentrics M, attached to shafts N, which work in bearings attached to the frame A, and have cranks N' attached to their ends, so that either or both ends of the bars H can be raised to adjust the concave at such a distance from the cylinder F as the work to be done may require. To the ends of the shafts N are also attached ratchet-wheels O, with the teeth of which engage pawls P, pivoted to the frame A, so that the concave will be held securely in any position into which it may be adjusted. By this construction the tooth-bars can readily be removed for replenishing them with new teeth and the concave adjusted nearer to or farther from the cylinder, as circumstances may require.

In the rear of the cylinder and concave are placed a row of five (more or less) beaters, Q, each of which is formed by connecting three radial wings to a shaft by means of two disks. The journals of the beaters Q revolve in bearings attached to the frame A. Above the forward beater, Q, is placed a single beater, R, which may be made with three or four wings, and its journals revolve in bearings attached to the frame A. The beaters Q R receive the straw from the cylinder, shake out the grain, and carry the straw back toward the tail end of the machine.

To the top of the machine are hinged a number of cross-bars, S, provided with downwardly-projecting teeth T, against which the straw strikes as it is passing back through the machine, and which project the straw downward upon the beaters Q and assist in shaking out the loose grain. To the top of the machine are also hinged a number of cross-bars, U, to which are attached downwardly-projecting plates V, for the loose grain to strike against and be stopped, and thus prevented from being blown out of the machine.

In the rear of the last beater Q is placed a rack, the frame W of which is made hopper-shaped. To the side bars of the frame W are attached the ends of cross-slats X, which are set in inclined positions, have their upper corners beveled, and have fingers Y attached to their upper edges. The fingers Y incline upward and rearward, are bent to the rearward, and are then bent upward, as shown in Fig. 2, so as to cause the straw to rise as it passes back over the rack, so that any loose grain that may be in it will be shaken out.

The rack W X Y is suspended by the bars Z, the upper ends of which are pivoted to the upper parts of the sides of the machine, and their lower ends are pivoted to the front and middle parts of the side bars of the rack-frame W. The grain that falls from the concave H I J K L and from the beaters Q R is received upon the inclined carrier placed in the lower forward part of the machine, the endless apron $a$ of which is formed of canvas. The endless apron $a$ is secured to three belts, $b$, more or less, which pass around pulleys $c$, attached to the shafts $d$. The journals of the forward shaft, $d$, revolve in bearings attached to the lower forward part of the frame A, and the journals of the rear shaft revolve in bearings attached to the middle parts of the sides of the said frame A.

To the apron $a$ and belts $b$ are attached cross-slats $e$, to prevent the grain from slipping back while being carried up the said endless apron. The grain falls from the upper end of the carrier into the cleaner-shoe $f$, which is shown in Fig. 2 with the sieves removed. To the inner surface of the forward side of the shoe $f$ is attached a cross-bar, $g$, which is provided with teeth $g'$, bent downward and then upward two or more times, as shown in Fig. 2, to cause the grain and chaff to fall loosely upon the sieves. The shoe $f$ is suspended by the bars $h$, the upper ends of which are hinged to the sides of the machine, and their lower ends are hinged to the sides of the shoe $f$. The shoe $f$ is provided with sieves varying in construction as the grain to be operated upon may require, and they are to be placed near the inclined bottom of the shoe.

In the upper part of the inclined bottom of the shoe $f$ is formed an opening, $n$, through which the tailings fall into the spout $o$. The tailings-spout $o$ is made with the upper parts of its sides inclined outward to prevent the movements of the shoe and spout from interfering with the passage of the tailings into the said spout. The tailings-spout $o$ is supported upon cranks $p$, which are pivoted to the ends of arms or brackets $q$. The other ends of the arms or brackets $q$ are pivoted to the frame A.

To the middle part of the bottom of the spout $o$ is rigidly attached an arm, $r$, to the end of which is pivoted the end of the bent lever $s$. The lever $s$ is fulcrumed at its angle to a bottom cross-bar of the frame A, and its other end is pivoted to the shoe $f$, so that the vibration of the shoe $f$ will impart a transverse movement and at the same time a slight longitudinal movement to the spout, whereby the clogging of the same is avoided and an accurate discharge of the tailings insured. The tailings are discharged by the spout $o$ into the well of the elevator $t$, whence they are taken by the cups $u$ of the elevator-belt $v$ and discharged into the spout $w$, down which they slide to the feed-apron $x$, and again pass through the machine.

The elevator $t$ is attached to the frame A, and is arranged with its belt $v$ and cups $u$ resting upon their edges, so that the elevator cannot become clogged, and so that the belt $v$ between the cups $u$ will not become foul. The upper end of the spout $w$ is connected to the upper end of the elevator $t$ by the bars $y$ and $z$. The upper ends of the bars $y$ are pivoted to the opposite sides of the upper end of the said elevator, and their lower ends are pivoted to the ends of the bar $z$, attached to the upper end of the spout $w$. The lower end of the spout $w$ rests upon and is hinged to the middle part of the crank 1, the ends of which work in supports 2, attached to the casing of the cylinder F G, so that the said spout can vibrate freely.

The lower part of the inner end of the shoe $f$ is opened, so that the grain, while passing through the said shoe, will be exposed to a blast of air from the fan-blower 3, and thus freed from chaff and other light impurities, which will be blown out into and carried off with the straw.

To one of the journals of the thrashing-cylinder F G is attached a pulley, 4, to receive the driving-belt, and to its other journal is attached a pulley, 5, around which passes a belt, 6. The belt 6 also passes around a pulley, 7, attached to a journal of the upper beater, R, and around a pulley, 8, attached to the journal of the shaft 9, which revolves in bearings attached to the lower part of the frame A. The belt 6 also passes over a guide-pulley, 10, pivoted to the frame A, to give the said belt such a direction as will give it a longer bearing upon the pulley 5, and thus make its movement more sure. To the other journal of the shaft 9 is attached a small pulley, 11, around which passes a belt, 12. The belt 12 is crossed and passes around a pulley, 13, attached to the journal of the shaft $d$, that drives the endless apron $a\ b\ c$, that carries the grain to the cleaner-shoe $f$. To the same journal of the shaft 9 is also attached a larger pulley, 14, around which passes a belt, 15. The belt 15 also passes around a pulley, 16, attached to a journal of the shaft of the fan-blower 3, to operate the said fan-blower. To the other journal of the upper beater, R, is attached a pulley, 58, around which passes a belt, 17. The belt 17 is crossed and passes around a larger pulley, 18, attached to the journal of one of the beaters Q.

To the journal of each of the beaters Q, at the other side of the machine from the pulley 18, is attached a crank or crank-wheel, 19, to the crank-pins of which is pivoted a bar, 20, so that all the beaters Q will be operated at the same time and from the one driven by the pulley 18. To the other journal of the upper beater, R, is attached a small pulley, 21, around which passes a belt, 22. The belt 22 also passes around a pulley, 23, attached to the outer end of a short shaft, 24, which revolves in bearings attached to the upper end of the elevator $t$, and is connected by suitable gearing with the upper roller of the elevator $t$, so as to give motion to the elevator-belt.

To the inner end of the short shaft 24 is attached a crank or crank-wheel, to the crank-pin of which is pivoted the end of a pitman, 28. The other end of the pitman 28 is attached to the discharge-spout $w$ of the elevator $t$, to vibrate the said spout and cause the tailings to pass down it freely.

To the middle part of the shaft 9 is attached a small gear-wheel, 29, the teeth of which mesh into the teeth of the larger gear-wheel, 30, attached to the middle part of the shaft 31. The journals of the shaft 31 revolve in bearings attached to the frame A, and to the said journals are attached the crank-wheels 33.

To the crank-pins of the crank-wheels 33 are pivoted the ends of the connecting-rods 35, the other ends of which are pivoted to the lower ends of the upright levers 36. The lower ends of the levers 36 are also pivoted to the shoe $f$, and their upper ends are pivoted to the straw-carrying rack W X Y. The levers 36 are pivoted to the frame A at points at a less distance from their lower ends than from their upper ends, so that the rack W X Y will have a longer and quicker movement than the shoe $f$. To the other journal of the shaft of the fan-blower 3 is attached a small pulley, 37, around which passes a belt, 38. The belt 38 is crossed and passes around a pulley, 39, attached to the end of the shaft 40, which revolves in bearings attached to the lower part of the rear end of the frame A, and around which passes the endless apron 41 of the straw-stacker 42.

The straw-stacker 42 is supported adjustably at any desired elevation by the cords or chains 43, the outer ends of which are attached to the said stacker, and their inner ends are attached to the shaft 44, or to spools or drums attached to the said shaft.

The shaft 44 revolves in bearings attached to the upper part of the frame A at a little distance from its rear end, and to its end is attached a crank, 45, by means of which the shaft 44 can be turned to raise and lower the stacker. The shaft 44 is held from being turned back by a pawl, 46, pivoted to the frame A, and which engages with the teeth of the ratchet-wheel 47, attached to the said shaft 44.

To the sides and tops of the rear end of the frame A are hinged three doors, 48, which, when shut, close the rear end of the machine, and when open form a guide-chute to guide the straw to the lower part of the stacker, and prevent it from being scattered by the air-blast from the machine.

In the lower part of the bottom of the shoe $f$ is formed an opening, 49, through which the screenings fall into the spout 50, and are discharged into some suitable receiver. When the screen is not used, the opening 49 is closed by a slide. The cleaned grain falls from the lower end of the bottom of the shoe $f$ into the spout 51, and is discharged into some suitable receiver.

The feed-table $x$ is supported by arms 52, attached to the frame A, and its inner edge rests upon the outer ends of the bars H, so that the said feed-table will always be in proper position however the concave of the thrasher be adjusted.

The feeder's platform 53 is attached to arms 54, which are hinged at their inner ends to the lower part of the front end of the frame A, and are supported by the chains 55. The upper ends of the chains 55 are attached to the outer ends of the arms 52, whence they pass around guide-pulleys 56, pivoted to supports attached to the outer ends of the arms 54, and are hooked upon hooks 57, attached to the said arms 54 at a little distance from their outer ends. With this construction the platform 53 can be readily raised and lowered by lengthening and shortening the chains 55.

Having thus fully described my invention, I claim as new and desire to secure by Letters Patent—

1. In a grain thrasher and separator, the combination, with the grooved and recessed curved bars H, of the removable tooth-bars I J, the removable plate K, extending partially under the said tooth-bars, and the removable rack L, in front of and below the tooth-bars, substantially as herein shown and described.

2. In a grain thrasher, separator, and cleaner, the combination, with the series of winged beaters Q R, of the vibrating rack having inclined cross-slats X, provided with fingers Y, substantially as herein shown and described, whereby the straw is carried back and the loose grain is shaken from it, as set forth.

3. In a grain thrasher, separator, and cleaner, the combination, with the series of winged beaters Q R, of the suspended and hinged toothed bars S T, suspended above the beaters, substantially as herein shown and described, whereby the straw is projected downward to the said beaters, as set forth.

4. In a grain thrasher, separator, and cleaner, the combination, with a series of winged beaters Q R and the vibrating rack W X Y, of the suspended hinged plates U V, substantially as herein shown and described, whereby loose grain is prevented from flying out of the machine, as set forth.

5. In a grain thrasher, separator, and cleaner, the combination, with the frame A, the tailings-spout o, and the cleaner-shoe f, of the pivoted cranks p, the hinged brackets q, the rigid arm r, and the bent levers s, substantially as herein shown and described, whereby the said spout will be vibrated from the said shoe, as set forth.

6. In a grain thrasher and separator, the combination, with the beaters Q and the shoe f, of the rack W X Y, suspended over the shoe, and the lever 36, pivoted to said shoe and rack, and means for operating said lever, substantially as herein shown and described.

7. In a grain thrasher and separator, the combination, with the concave H I J K L and the series of beaters Q R, of the endless apron a b, provided with slats e, the shoe f, and means for operating said endless apron and shoe, substantially as herein shown and described.

8. In a grain thrasher and separator, the combination, with the endless apron a b e, of the shoe f, provided with the teeth g', the rack W X Y, suspended over the shoe, the lever 36, the connecting-rod 35, the crank 33, the shaft 31, and means for operating the shaft 31, substantially as herein shown and described.

9. In a grain thrasher, separator, and cleaner, the combination, with the arms 52, that support the feed-table x, and the hinged platform 53 54, of the chains 55, the pulleys 56, and the hooks 57, substantially as herein shown and described, whereby the height of the said platform can be readily regulated, as set forth.

OLE O. GRAVES.

Witnesses:
    IVER E. ELLEFSON,
    IVER E. OIAAS.